Feb. 10, 1970 M. S. KAPLAN Re. 26,785

METHOD FOR CASTING JEWELRY BY THE LOST WAX PROCESS

Original Filed Aug. 4, 1964 2 Sheets-Sheet 1

INVENTOR.

MORTON S. KAPLAN

BY

Mullman and Jacobs

ATTORNEYS

METHOD FOR CASTING JEWELRY BY THE LOST WAX PROCESS

Original Filed Aug. 4, 1964 2 Sheets-Sheet 2

INVENTOR.
MORTON S. KAPLAN
BY
Mullman and Jacobs
ATTORNEYS

United States Patent Office

Re. 26,785
Reissued Feb. 10, 1970

26,785
METHOD FOR CASTING JEWELRY BY THE LOST WAX PROCESS

Morton S. Kaplan, Miami, Fla., assignor to Micro-Thermal Applications, Inc., Dover, Del., a corporation of Delaware Original No. 3,302,257, dated Feb. 7, 1967, Ser. No. 387,403, Aug. 4, 1964. Application for reissue Dec. 6, 1968, Ser. No. 786,786
Int. Cl. B22c *9/02*
U.S. Cl. 164—34 6 Claims

Matter enclosed in heavy brackets [ ] appears in the original patent but forms no part of this reissue specification; matter printed in italics indicates the additions made by reissue.

*ABSTRACT OF THE DISCLOSURE*

*This disclosure relates to a method of making an article of jewelry of the type having a decorated annular bezel about a main body portion. A legend is routed on the bezel surface of a soft metal blank which is subsequently held adjacent a mold cavity corresponding to the body portion. The entire article of jewelry is molded in wax in the cavity and then cast in metal via the lost wax process to form an integral article of jewelry having a decorated annular bezel thereon.*

This invention relates to method and apparatus of molding rings, pendants and similar items of jewelry and particularly school or organization rings wherein the body of the ring generally contains decorative matter and year numerals and the top or cap mounts a stone or gem and includes an annular bezel containing the name of the school or organization.

Heretofore such school rings were made by several methods. In one, the metal was struck flat, then rounded about a mandrel and the seam butt welded to form the body. Then the bezel containing the school letters was made as a separate unit using a steel hub or die and striking metal against it, after which the excess metal was trimmed away to produce the bezel. The bezel was then soldered to the top of the body of the ring. Thereafter, a stone setter cut out a bearing or seat on the inner periphery of the bezel and a stone was set therein to complete the ring. In another method, the same procedure was used except that the body of the ring was made by casting instead of striking. In yet another method, the body is cast in wax, the bezel is struck from a steel die and a wax model is made therefrom. The wax bezel is then glued to the wax body and both are then cast in metal.

The aforementioned methods are uneconomical because, for every school, an individual steel hub or die must be used to strike the bezel. Then a stone bearing must be cut into the bezel in a separate step as such cannot be provided by striking metal against the steel hub or die. This procedure must be repeated for each order of rings of a particular school and where an order for rings of a new school is received, a steel hub or die must be made up, which is relatively expensive. Moreover, should the manufacturer receive an order for one or only a few of such rings, the cost of making up a special steel hub or die would make the cost of the ring prohibitive.

It is the primary object of this invention to provide apparatus and a method of molding rings of the character above described which overcome the aforementioned disadvantages residing in the conventional methods so that rings, pendants and similar articles can be made economically, both individually and in large quantities, thereby making it possible to supply such articles on a mail order basis.

An important object of the invention is to provide apparatus and a method of molding rings, pendants and similar [article sof] *articles of* jewelry having a body portion and a decorated annular bezel which does not require the use of a separate steel hub or die with decorative matter therein from which the bezel is struck and by which a wax model of the entire ring including the body portion and the bezel or the entire ring in white or soft metal is molded in a single step or operation.

Another object of the invention is to provide apparatus and method of molding a wax model of rings, pendants and similar articles of jewelry having a body portion and an annular decorative bezel in a single step using split white metal molds for the body portion and a mold unit for the bezel, the latter including a white metal blank into which the desired decorations, such as the name of the school or organization, has been cut or routed out as by a pantograph. Thus, the method is rendered most economical and versatile since rings can be readily made in any quantity and to order by using one of several molds corresponding to standard ring body designs, taking a white metal bezel blank from stock and routing the desired letters therein at that time, and inserting the same into the mold.

Another object of the invention is to provide apparatus and method of molding rings, pendants and similar articles of jewelry having a body portion and an annular decorative bezel of white or soft metal wherein a white metal bezel, made without striking it from a steel die or hub, is secured to the body portion and the entire jewelry article is used to make a plurality of mold cavities in cooperative rubber mold plates and then white metal is cast centrifugally in the cavities.

These and other objects of the invention will become more apparent as the following description proceeds in conjunction with the accompanying drawings, wherein.

Specific reference is now make to the drawings in which similar reference characters are used for corresponding elements throughout.

Figure 1:
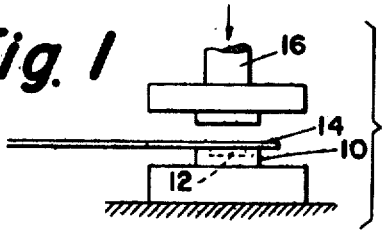
FIG. 1 is a diagrammatic view of the first step in one form of the invention.
Figure 3:
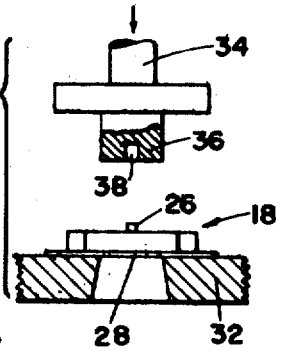
FIG. 3 is a diagrammatic view, partly in section, illustrating the step of punching out the blank.
Figure 2:
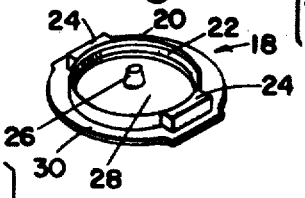
FIG. 2 is a perspective view of the blank bezel piece made in the step of FIG. 1.
Figure 4:
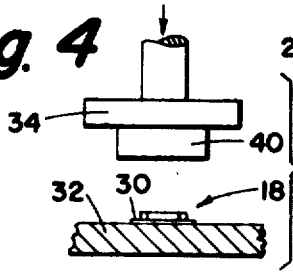
FIG. 4 is a view similar to FIG. 3 illustrating the step of trimming the blank.
Figure 5:
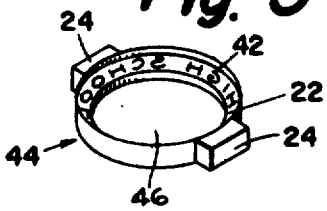
FIG. 5 is a perspective view of the bezel blank with letters applied thereto ready for insertion in the molding apparatus.

Referring first to FIGS. 1–6, a die or hub 10, preferably of steel, is provided having an annular groove 12 therein corresponding to the desired bezel of a ring, pendant or similar article. A bar of white or soft metal 14 is placed over the hub and by means of a conventional press 16 an unfinished blank member 18 is formed having embossed therein an annular raised portion 20 with an inclined face 22 therein, diametrically opposed tongue members 24 for a purpose later to appear and, of course, excess material including a button 26 carried by metal 28 on the inside of the raised portion 20, and metal or flashing 30 on the outside thereof.

The member 18 is then placed on the lower shoe 32 of a punch press 34 having a punch 36 with a relief 38 therein corresponding to the button 26, the outer diameter of the punch being equivalent to the inner diameter of the annular raised portion 20. The punch operation removes the inner metal 28 and button 26. By replacing the punch 36 with another die 40 in the press, see FIG. 4, the flashing 30 is trimmed off.

The cored and deflashed member is then placed in a pantograph and the inner inclined face 22 is routed to produce the desired letters 42 therein, such as the name of a particular school or organization. Thus, a bezel blank 44 is produced with a central opening 46, a decorated inner annular inclined face 22 therearound and diametrically opposed tongues 24.

Figure 6:
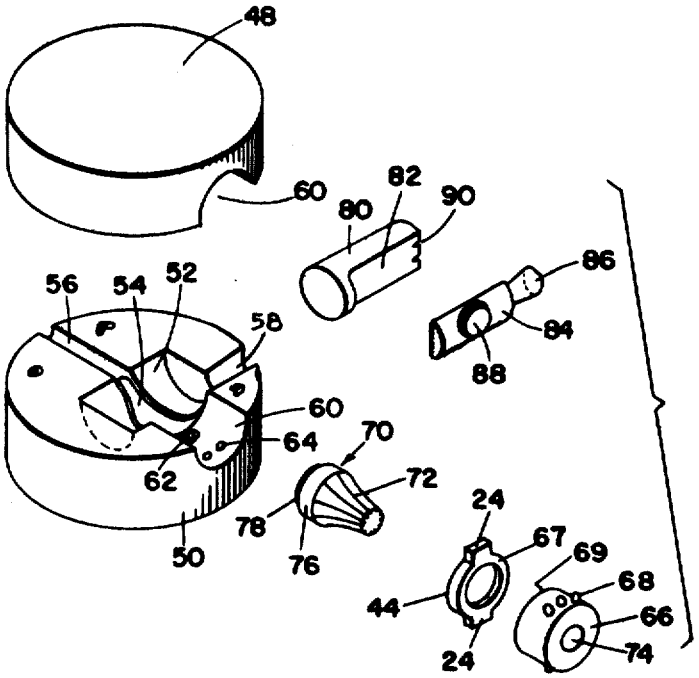
FIG. 6 is a group perspective view of the wax molding apparatus employing the blank of FIG. 5.
Figure 7:
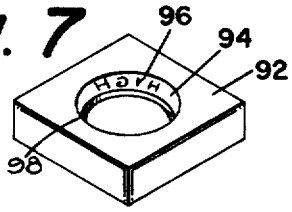
FIG. 7 is a perspective view of a machine brass hub employed in a second form of the invention.
Figure 8:
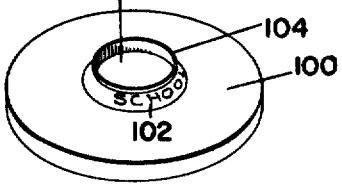
FIG. 8 is a perspective view of a white metal bezel blank made from the hub of FIG. 7.
Figure 9:
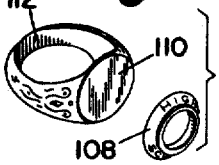
FIG. 9 is a group perspective view of a ring body and trimmed bezel blank in position to be secured on the face of the ring.
Figure 10:
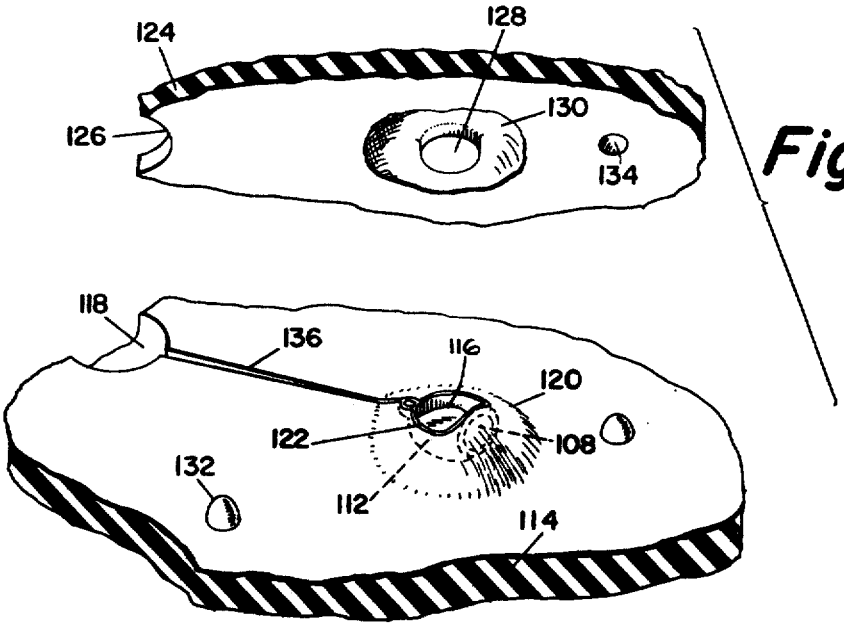
FIG. 10 is a fragmentary group perspective view of rubber plates with ring mold cavities formed therein.
Figure 11:
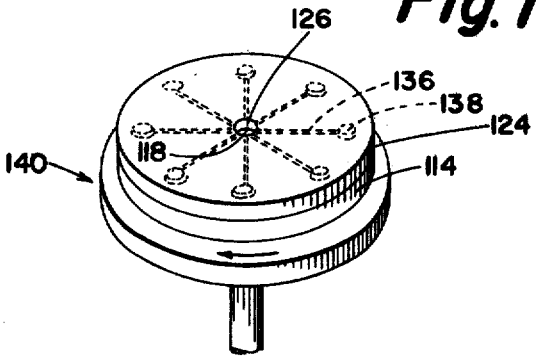
FIG. 11 is a diagrammatic perspective view illustrating the centrifugal casting of metal in the mold cavities of the rubber plates of FIG. 10.

A mold made of white or soft metal is provided, as shown in FIG. 6, the same including, among other things, upper and lower complementary cylindrical members 48 and 50. Each member includes a semi-cylindrical major cavity 52, a diametrically extending minor cavity 54 defining one-half of the contour of the body of the ring, including decorations if desired, a wax inlet passageway 56 in diametrical alignment with the cavity 54 and a further cavity 58 at an angle to the axis of the major cavity. A further semi-cylindrical cavity 60 is provided whose axis is in alignment with that of the body contour cavity 54 and perpendicular to that of the major cavity 52. The cavity 60 includes a slot 62 adapted to receive one of the tongues 24 of the bezel blank 44 and indentations 64 spaced therefrom.

A ring-like back up member 66 is provided having protuberances 68 extending from its peripheral surface adapted to enter the indentations 64. The flat face 67 of the bezel blank 44, i.e. the face opposite the decorated inclined face 22, is placed against the inner face 69 of the back up member 66 and a plug 70 is employed which is a tapered unit having axial slits 72, the plug fitting through the holes 46 and 74 of the bezel blank 44 and back up member 66 and including a head 76 having an annular shoulder 78. A mandrel to fill the cavities 52 is provided comprising a brass substantially cylindrical member 80 having a chordal cut-out 82 which is filled in by a white metal member 84 having an axial extension 86 adapted to enter the cavity 58 and a radial head 88 to oppose the head 76 of the plug 70.

When the units making up the mold are assembled, the mandrel members 80, 84 fit into the cooperating cavities 52 with the extension 86 extending into the cooperating cavities 58, the tongues 24 fit into slots 62 and the protuberances 68 fit into the indentations 64 with the result that there will be a continuous cavity 54 in a particular plane representing the body of the ring, a cavity equivalent to the bezel inner face 22 in a plane substantially perpendicular to that of the body portion and at its end to represent the top of the ring, and a cavity equivalent to the shoulder 78 immediately to the rear of the bezel face 22 representing the stone bearing. As is conventional, the two halves 48 and 50 of the mold are properly located by interengagement of protuberances on one half fitting into indentations in the other.

Wax is then forced under pressure into the mold via the cooperating cavities 56, the slits 72 in the plug 70 and the notches 90 in the mandrel acting as vents for the displaced air. Upon cooling in a very short time, the mold halves are separated, the plug 70, bezel blank 44 and back up member 66 removed as a unit, and the two portions 80 and 84 of the mandrel separated to provide a wax model of the desired ring. If different decorations on the body portion of the ring are desired, the mold cavities 54 can be made smooth and with indentations to receive desired decorated inserts.

The wax model is then used to make a plaster model and then the ring is cast into the desired metal, such as gold, silver, etc., all by the conventional lost wax or investment process.

Thus, by employing molds for a number of standardized body designs and providing unadorned bezel blanks for the different designs, all that is required for making one or a plurality of school or organization rings is to take the blank and rout the name therein by a pantograph, then insert the decorated bezel blank into the mold, make a wax model and finally cast the ring of the desired metal through the lost wax process.

Referring now to FIGS. 7–11, the method and apparatus shown therein are designed to provide a means to make school and organizational rings of the type described hereinbefore in large quantities and relatively inexpensively out of white metal. A die or hub 92 of machine brass is made in which the bezel surface 94 and letters 96 are routed out by a pantograph as is a further inclined surface 98 therebeneath for a stone bearing. A white metal bar is struck on the hub to produce a crude blank having flashing 100, a raised decorated bezel 102, a stone bearing 104 and a central flat potion 106. The flashing 100 is removed to provided the decorated bezel unit 108, see FIG. 9. This unit is secured by adhesion or other means to the flat top face 110 of a ring 112 of desired size, shape and decoration.

Into a lower circular slab of rubber 114 a plurality of circular cuts 116 are made to conform to the inner contour of the ring 112 and the ring is pushed thereinto with the bezel unit or top facing away from the center of the slab which is formed with a dished in portion 118. Rubber is pushed around the ring to form a mound 120 which covers or buries the ring up to its upper edge 122. A complementary upper circular rubber slab 124 is [rovided] *provided* having a central hole 126 in vertical alignment with the indentation 118 of the lower slab. At positions corresponding to the cuts 116, the upper slab includes depending pintles 128 and indentations 130 thereabout, so that when the upper slab is closed upon the lower one, the pintles 128 enter the buried rings to serve as mandrels and the indentations 130 receive the mounds 120, there being upstanding pins 132 in the lower slab and indentations 134 in the upper slab to serve as a locating and orienting means.

Before closure, the meeting faces of the slab are coated with powder and after closure the slabs are subjected to vulcanizing pressures and temperatures. After vulcanization, the slabs are separated, the rings removed and radial slits 136 are cut into the lower slab 114 from the central indentation 118 to each mold cavity 138 formed in the slab.

The slabs are again closed and placed upon the support of a centrifuge 140 and molten white metal is poured through the hole 126 of the upper slab as the slabs are rotated, the metal striking the indentation 118 in the lower slab and passing via the radial slits 136 into the mold cavities 138 where the metal is centrifugally cast in the desired ring form. A stone is then set into the bezel unit against the bearing 104 and the central portion 106. If desired, the central portion 106 can be punched out. Thus, by stocking a plurality of rubber molds of predetermined ring designs, including the decorated bezels, an order, consisting of one or a plurality of rings of a particular school or organization can be readily filled and rather inexpensively.

If one desires to cast the ring in metal, such as silver or gold, one can pour molten wax through the hole 126 of the upper slab and cast the same centrifugally in the mold cavities 138. Thereafter, casting in the metal from the wax model can be effected by the lost wax process as described in connection with process of FIGS. 1–6.

While preferred embodiments of the invention have here been shown and described, it will be understood that skilled artisans may make minor variations without departing from the spirit of the invention and the scope of the appended claims.

I claim:

1. A method of makng a ring having a body portion and decorated annular bezel at one end thereof in a plane substantially perpendicular to that of said body portion comprising the steps of forming a blank of soft metal having a bezel surface, routing a legend in said surface, providing a mold cavity corresponding to the size and contour of said body portion, holding said blank adjacent said mold cavity so that said bezel surface extends substantially at right angles to the plane of said mold cavity to form an additional mold cavity corresponding to said bezel, molding the entire ring in said cavities in wax and casting said ring in metal via the lost wax process.

2. A method of making a ring having a body portion and a decorated annular bezel at one end thereof in a plane substantially perpendicular to that of said body portion comprising the steps of forming a blank of soft metal having a bezel surface, routing a legend in said surface, routing a shoulder in said blank adjacent and around said bezel surface for a stone bearing, said shoulder forming a stone bearing, providing a mold cavity corresponding to the size and contour of said body portion, holding said blank adjacent said mold cavity so that said bezel surface extends substantially at right angles to the plane of said mold cavity to form an additional mold cavity corresponding to said bezel and said shoulder, molding the entire ring in said cavities in wax, casting said ring in metal via the lost wax process, and setting a stone against said stone bearing.

3. A method of making a ring having a body portion and a decorated annular bezel at one end thereof in a plane substantially perpendicular to that of said body portion comprising the steps of forming a blank of soft metal having a bezel surface, routing a legend in said surface by pantograph, providing a mold cavity corresponding to the size and contour of said body portion, holding said blank adjacent said mold cavity so that said bezel surface extends substantially at right angles to the plane of said mold cavity to form an additional mold cavity corresponding to said bezel, molding the entire ring in said cavities in wax and casting said ring in metal via the lost wax process.

4. A method of making a ring having a body portion and a decorated annular bezel at one end thereof in a plane substantially perpendicular to that of said body portion comprising the steps of forming a blank of soft metal having a bezel surface, routing a legend by pantograph in said surface, routing a shoulder by pantograph in said blank adjacent and around said bezel surface for a stone bearing, providing a mold cavity corresponding to the size and contour of said body portion, holding said blank adjacent said mold cavity so that said bezel surface extends substantially at right angles to the plane of said mold cavity to form an additional mold cavity corresponding to said bezel and said shoulder, molding the entire ring in said cavities in wax, casting said ring in metal via the lost wax process, and setting a stone against said stone bearing.

*5. A method of making an article of jewelry having a body portion and decorated annular bezel at one end thereof comprising the steps of forming a blank of soft metal having a bezel surface, routing a legend in said surface, providing a mold cavity corresponding to the size and contour of said body portion, holding said blank adjacent said mold cavity to form an additional mold cavity corresponding to said bezel, molding the entire article of jewelry in said cavities in wax and casting said article of jewelry in metal via the lost wax process.*

*6. A method of making an article of jewelry having a body portion and decorated annular bezel at one end thereof in a plane substantially parallel to that of an adjacent surface of said body portion comprising the steps of forming a blank of soft metal having a bezel surface, routing a legend in said surface, providing a mold cavity corresponding to the size and contour of said body portion, holding said blank adjacent said mold cavity so that said bezel surface extends substantially parallel to the plane of said mold cavity as defined by said adjacent surface of said body portion to form an additional mold cavity corresponding to said bezel, molding the entire article of jewelry in said cavities in wax and casting said article of jewelry in metal via the lost wax process.*

References Cited

The following references, cited by the Examiner, are of record in the patented file of this patent or the original patent.

UNITED STATES PATENTS

| | | | |
|---|---|---|---|
| 695,507 | 3/1902 | Strang | 249—57 |
| 1,567,402 | 12/1925 | Venn | 18—44 |
| 1,899,258 | 2/1933 | Bush | 18—44 |
| 2,354,026 | 7/1944 | Jungerson | 164—35 |
| 2,362,136 | 11/1944 | Jungerson | 249—57 X |

J. SPENCER OVERHOLSER, Primary Examiner

R. S. ANNEAR, Assistant Examiner

U.S. Cl. X.R.

18—42; 164—35; 249—57